Aug. 11, 1953
E. M. McELLIGOTT
2,648,098
PROCESS FOR PRODUCING PEARLESCENT PLASTIC ARTICLES
Filed Oct. 4, 1949
2 Sheets-Sheet 1
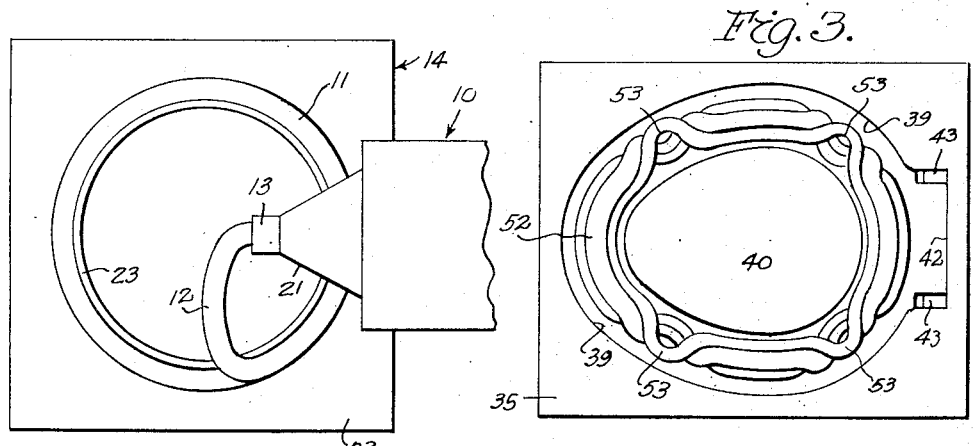
Fig. 1.
Fig. 3.
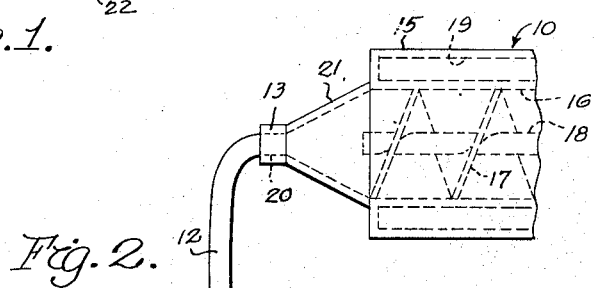
Fig. 2.
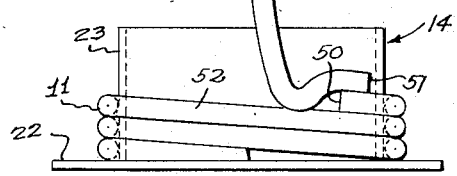
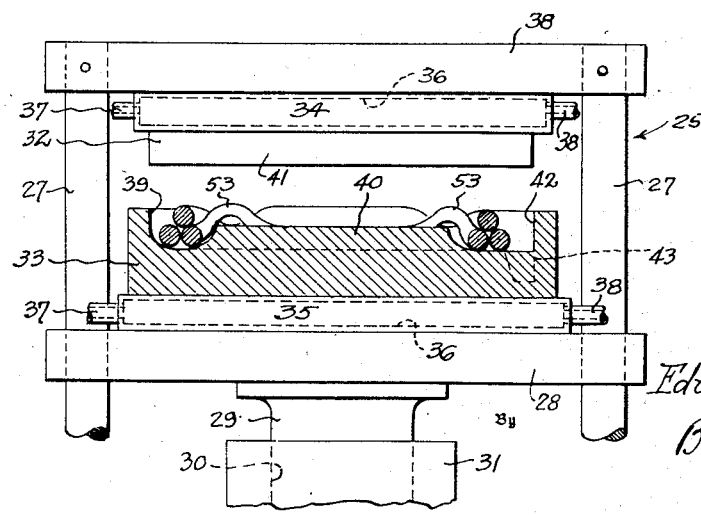
Fig. 4.
Inventor
Edward M. McElligott
Barthel & Bugbee
Attorneys Aug. 11, 1953 E. M. McELLIGOTT 2,648,098
PROCESS FOR PRODUCING PEARLESCENT PLASTIC ARTICLES
Filed Oct. 4, 1949 2 Sheets-Sheet 2
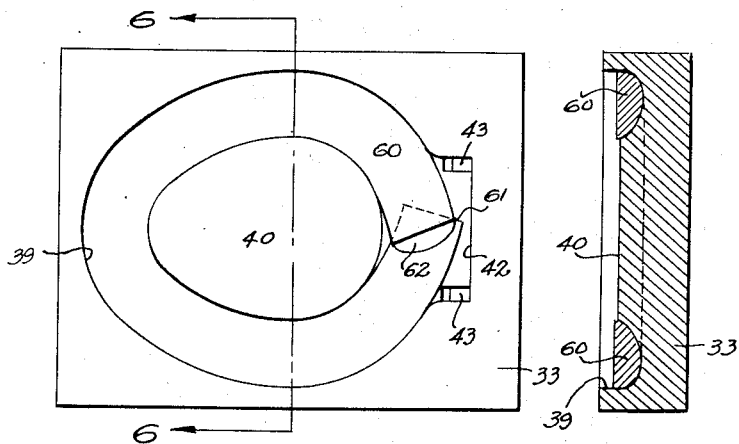
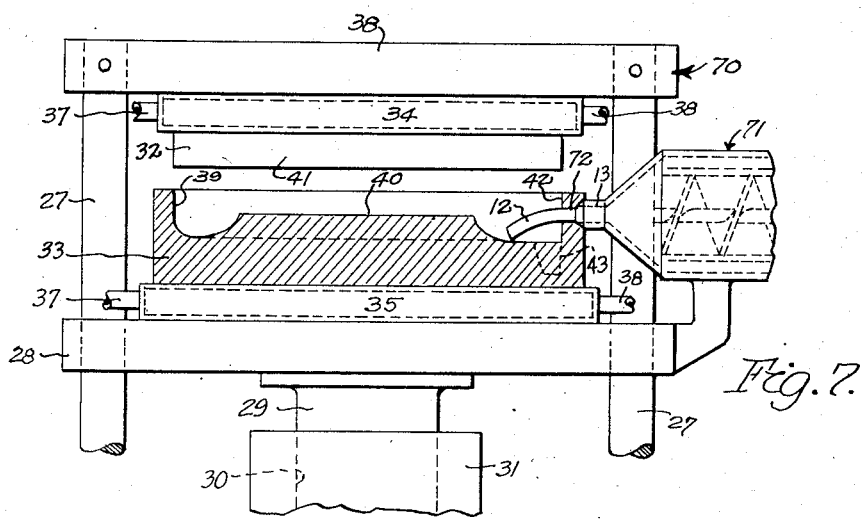
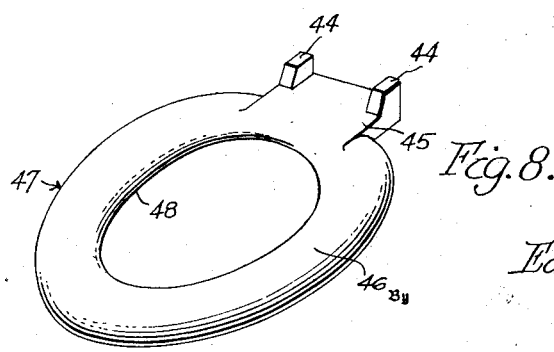
Inventor
Edward M. McElligott
By Barthel & Bugbee
Attorneys Patented Aug. 11, 1953

2,648,098

UNITED STATES PATENT OFFICE 2,648,098

PROCESS FOR PRODUCING PEARLESCENT PLASTIC ARTICLES

Edward Michael McElligott, Detroit, Mich., assignor to Swedish Crucible Steel Company, Detroit, Mich., a corporation of Michigan Application October 4, 1949, Serial No. 119,434

5 Claims. (Cl. 18—47.5)

1

This invention relates to molding processes, and in particular to a process for molding pearlescent articles, such as picture frames, toilet seats and the like.

One object of this invention is to provide a process of producing solid pearlescent plastic articles which shall exhibit a variegated pearlescent appearance in all parts of the article, even in cross-section, and wherein the completed article will be permanently free from delamination or splitting apart in layers.

Another object is to provide a process of making pearlescent articles wherein a charge of a predetermined weight of the pearlescent plastic material is extruded from a mixing or extruding machine into a form conveniently handled in a molding press and conveniently manipulated by the operator with a minimum of operations.

Another object is to provide a process of producing pearlescent plastic articles wherein a charge of a predetermined weight of the mixture of plastics which produces the pearlescent effect is extruded onto a convenient holder from which it is easily removed by the operator, twisted into irregular shape to break up regularity or repetition of pattern, and transferred to the mold cavity of a molding press.

Another object is to provide a process of producing open-centered pearlescent plastic articles such as picture frames, toilet seats and the like wherein a charge of a predetermined weight of the mixture of plastics producing the pearlescent effect is extruded from a mixer in a rope-like mass, arranged in an open-centered formation on a convenient holder, or coiled directly into the mold cavity of a molding press, twisted by the operator to break up regularity of pattern and prevent delamination, and molded while in this twisted form.

Another object is to provide a process for molding open-centered pearlescent plastic articles wherein a mixing machine for the mixture of plastic materials which produce the pearlescent effect is provided with an extrusion orifice having a cross-section approximately corresponding to the cross-section of the mold cavity and consequently of the article to be molded.

In the drawings:

Figure 1 is a top plan view of a plastic charge holder upon which a coil of rope-like plastic material is being extruded from a mixing or extruding machine;

Figure 2 is a side elevation of the apparatus shown in Figure 1, showing the overlapping of the rope-like material to prevent seams;

2

Figure 3 is a top plan view of the lower mold showing the coil of plastic material in the mold cavity, after it has been twisted to prevent delamination and insure irregularity of pattern;

Figure 4 is a side elevation of the upper portion of a molding press, with the lower mold in central vertical section through Figure 3;

Figure 5 is a top plan view of a lower mold similar to Figure 3, but showing a modification of the process and apparatus wherein a single coil of the material is extruded in approximately the cross-section of the article to be molded;

Figure 6 is a vertical cross-section taken along the line 6—6 in Figure 5;

Figure 7 is a side elevation, partly in central vertical section, of a modified molding press having a mixing or extruding device attached to the press and extruding the mixture of plastic materials directly into the mold cavity; and Figure 8 is a perspective view of an open-centered article produced by the process and apparatus of the present invention, such as a toilet seat.

General description

The molding of pearlescent plastic articles has hitherto been attended with great difficulty, especially as regards permanence of the article molded. Early efforts in producing pearlescent plastic articles consisted in applying a thin coating or skin-like layer of the pearlescent material over a core of wood or other suitable material. The plastic material used in these early processes was highly inflammable and required the use of dangerously explosive solvents which gave off noxious fumes, thereby making the process uncomfortable and even hazardous to the operator. Other inventors endeavored to mold pearlescent plastic articles by injecting mixtures of variegated plastic materials into a plastic injection molding machine, but the articles thereby produced were found to be impermanent in that they sooner or later developed delamination or peeling off and cracking between the various layers of the different plastic materials. The present inventor originated a process of producing solid pearlescent plastic articles which is described and claimed in his co-pending application Serial No. 34,644 filed June 23, 1948 for Process of Producing Pearlescent Articles now U. S. Patent No. 2,516,065.

According to this process, a mixture of mutually incompatible plastics such as polystyrene resin and methylmethacrylate resins in powder form is placed in a mixing and extruding machine from which the mixture of materials is extruded onto a weighing scale until a predetermined quantity is accumulated, whereupon the rope-like stream of plastic material is severed. The material is accumulated in charges consisting of small piles or coils, these being placed at predetermined spaced locations around the mold cavity of the lower mold of the molding press. When the mold halves were closed, the material in being compressed was spread sidewise from each charge so that a continuous article was produced, with a minimum of motion or travel of the material.

The present process and apparatus are an improvement on the prior process in that the necessity for weighing out and accumulating the separate multiple charges of material is eliminated, and the possibility of delamination occurring at the boundaries or junctions between the streams of material coming from the different charges in the mold cavity is still further reduced. According to one form of the present invention, the mixture of mutually incompatible plastics producing the pearlescent effect is extruded from the nozzle of an extruding machine onto a holder of stainless steel or other suitable material in a shape roughly resembling a man's straw hat, the rope-like mass of extruded material being coiled around the upstanding central flange of the device a sufficient number of turns to produce the desired predetermined weight of material which will exactly fill the mold with the minimum of flash remaining after molding. When the desired quantity has been thus accumulated in doughnut-like form, it is picked up by the operator, twisted at various points while preserving its open-centered form, and transferred in its twisted form to the mold cavity of a molding press. The mold is then closed, causing the strands of molding material to fill the mold cavity and produce the solid pearlescent article. The term "solid" is used herein to mean that the pearlescent effect is not merely a surface or skin effect, but extends entirely through the article.

By this improved process of the present invention, the finished article has a highly variegated appearance of pearlescence and at the same time is permanently free from delamination. The process is also substantially free from the necessity for estimates or guesswork on the part of the operator because a certain length of the plastic rope when coiled around the transfer device a specified number of turns gives a definite predetermined weight.

By a modification of the process and apparatus of the present invention (Figures 5 and 6), a single coil or strand of the material is extruded from the mixing machine through a nozzle having a cross-section approximately corresponding to the cross-section of the article to be molded. This is either extruded directly onto the mold cavity or transferred thereto from a holder, the ends of the strand or coil being overlapped to prevent delamination at that point. By a still further modification of the process and apparatus (Figure 7), the plastic mixture is extruded directly into the die cavity from the nozzle of an extruder attached directly to the press and discharging directly into the die cavity, the cord or rope of material being preferably led around the die cavity by being grasped by tongs in the hands of the operator.

Detailed description

Referring to the drawings in detail, Figures 1 to 4 inclusive show one form of process and apparatus for producing pearlescent plastic articles, according to the present invention. Figures 1 and 2 show an extruding machine, generally designated 10, depositing a coil 11 of plastic material from a rope-like stream 12 from the nozzle 13 of the extruding machine 10 onto a charge holder, generally designated 14. The extruder 10 is of a conventional type well-known to engineers and its details are outside the scope of the present invention. For the purposes of the present disclosure, therefore, it is sufficient to state that the extruding machine 10 consists of a hollow casing 15 (Figure 2) having a central bore 16 in which a screw 17 operates and is rotated by a shaft 18 driven by a motor and reduction gearing (not shown). A heating jacket or chamber 19 surrounds the bore 16 within the casing 15 and insures that the plastic mixture is kept sufficiently hot to cause fusion. The nozzle 13 has an orifice 20 of suitable size arranged at the end of a tapering nose portion 21. The mixture of plastic materials, such as polystyrene and methylmethacrylate resins in powder form is placed in a hopper (not shown) leading into the opposite end of the bore 16 from the nose portion 21. The mixture of powdered plastic materials is thoroughly agitated by the screw 17 and impelled forward at the same time, while it is heated by heat from the heating jacket 19. The latter may provide heat from steam or from an electric resistance winding, as is well known in such machines.

The charge holder 14 is preferably of stainless steel or other suitable material which is unaffected by the hot plastic materials being handled. It is roughly in the shape of a man's straw hat with a brim-like supporting plate 22 and a crown-like upstanding annular portion or flange 23 rising therefrom. In order to minimize its weight, the supporting plate 22 and upstanding portion 23 are both formed of relatively thin sheet material so that the upstanding portion 23 is roughly in the form of a hollow cylinder.

The molding press, generally designated 25, is of a conventional type having a head 26 connected by strain rods 27 to a bed (not shown). Reciprocating vertically toward and away from the press head 26 is a platen 28 mounted on a plunger 29 which is reciprocable in the bore 30 of a hydraulic cylinder 31. By supplying pressure fluid, such as oil, to the bottom of the cylinder 31, beneath the lower end of the plunger 29, the platen 28 is caused to rise. Mounted on the press head 26 and platen 28 are the upper and lower mold halves 32 and 33 respectively. Each of the mold halves 32 and 33 is provided with a hollow base 34 and 35 having a heating chamber 36 with inlet and outlet pipes 37 and 38 communicating therewith and connected to a source of suitable heating agent, such as steam. The lower mold half 33 preferably contains the major portion of the mold cavity 39, which in this instance is of approximately orbital shape with an island 40 rising in the middle thereof. The upper mold half 32 has a portion 41 of such an outline as to enter and fit snugly within the mold cavity 39, and its lower surface is such as to fit snugly against the upper surface of the island 40, thereby confining the material to the mold cavity 39. The latter, in the case of a toilet seat, has a side cavity 42 (Figure 3) with pockets 43 arranged to form upstanding lugs 44 (Figure 8) upon the rearward projection 45 or platform extending rearwardly from the seat portion 46 of the toilet seat, generally designated 47. The latter, of course, is of roughly angular or toroidal shape with an upper surface of arcuate cross-section and an open center 48.

In the operation of the apparatus shown in Figures 1 to 4 inclusive, and in carrying out the process of the present invention, the mixture of plastic materials in granulated form is placed in a conical tumbler or any other type of mixer and thoroughly mixed. The batch, as explained in my above-mentioned co-pending application, may consist of the following:

| | Per cent |
|---|---|
| Methylmethacrylate resin, clear | 60 |
| Polystyrene resin, clear | 35 |
| Polystyrene resin, colored | 5 |
| | 100 |

After mixing, the batch is placed in the hopper of the extruder whence it descends to the bore 16 thereof. As heat is applied to the chamber or jacket 19, either by steam or other heating agent or by an electrical resistance winding therein, the heat is transferred through the inner wall of the casing 15 to the batch and fuses the materials together so that it is extruded as a paste-like rope at a temperature of about 450° F.

As the rope-like strand 12 emerges from the nozzle 13 (Figures 1 and 2), it is permitted to deposit itself in a coil on the plate-like portion 22 of the holder 14, and is caused to wind around the upstanding flange 23 until the operator estimates that a sufficient weight of material has been accumulated, whereupon he snips the strand 12 with a pair of scissors, cutting it off at the end 50. In Figure 2, it has been assumed that his estimate was incorrect and that an additional weight of material was necessary to create the desired size of charge. The holder 22 may be placed on the platform of a weighing scale as described in my above-mentioned co-pending application, and weighed accurately. In depositing further material (Figure 2), the operator overlaps the end 51 with the end 50 so as to avoid a seam at this point. When the correct weight is obtained, the strand 12 is again severed.

The operator now grasps the ring-like mass or coil of material on the holder 14 and lifts it off the holder, using gloves to insure cleanliness. The operator then twists the charge or coil 52 thus obtained at the location 53 (Figures 3 and 4) around the center line of the coil as an axis of twist in order to further insure irregularity of distribution and to further minimize the danger of delamination, producing the effect shown in Figure 3. He then places the thus twisted coil or charge 52 in the mold cavity 39, as shown in Figures 3 and 4. The number of turns making up the coil constituting the charge 52 on the holder 14 depends, of course, upon the size of the orifice 20 in the nozzle 13 of the extruder 10. It is found convenient for one size of article and a certain size of orifice to wind about three turns around the upstanding portion 23. It is preferred that the end of the strand shall terminate approximately diametrically opposite the beginning thereof so as to further minimize delamination.

Meanwhile, the upper and lower mold halves 32 and 33 have been suitably heated to approximately 325° to 350° F., such as by supplying steam to the heating jackets or chambers 36. Pressure fluid is then supplied to the bottom of the hydraulic cylinder 31 causing the plunger 29, platen 28 and lower mold half to rise, closing the mold halves and causing the coil-like charge 52 of material to spread out and fill the mold cavity. A pressure of approximately 3000 to 4000 pounds per square inch is employed, by using a molding pressure of approximately 250 tons.

When the mold halves 32 and 33 have completely closed, they are permitted to remain closed for three or four minutes so as to eject the flash or excess plastic material out of the mold, the amount of flash depending upon how closely the operator has estimated the charge to fill the mold cavity. Cooling water at approximately 80° F. is then passed through the chambers 36, cooling down the mold halves 32 and 33 and solidifying the contents. The fluid is then released from the cylinder 31, causing the platen 28 and mold half 33 to descend and open the mold. The molded article is then removed from the mold cavity 39 and the latter and the upper mold half 32 carefully cleaned so as to leave no trace of molding material or other foreign matter. The foregoing procedure is then repeated to mold subsequent articles 47. The article itself is found to exhibit a variegated pearlescent appearance and delamination does not occur even though the article is used over a long period of time.

*Modified processes*

The modified process of Figures 5 and 6 employs the same or similar apparatus as that shown in Figures 1 to 4 inclusive, except that the extruder 10 is provided with a nozzle 13 having an orifice 20 sufficiently large in cross-section to approximate the size and shape of cross-section in the article to be molded. The charge 60 is extruded as before, but only a single turn is made (Figure 5) and the ends 61 and 62 are overlapped to prevent seams and a possible source of delamination. The charge 60 is either extruded directly into the mold cavity 39 or transferred thereto, and the pressing procedure is then carried out in the manner described. As the mold halves come together, the additional thickness of material provided by the overlapping ends 61 and 62 spreads into the space 42 and pockets 43 at the rearward end of the mold cavity, filling this space and consequently providing the platform 45 and lugs 44 on the finished article 47 (Figure 8). In order to provide this result, it is of course desirable that the overlapped ends 61 and 62 be placed adjacent the space 42 so that the material will be required to move the least possible distance while it is filling the mold cavity.

The modification shown in Figure 7 employs a similar molding press to that shown in Figure 4, and similar parts are similarly designated with reference numerals. The modified apparatus is provided with an extruder 71 which is attached directly to the platen 28 and which has its nozzle 13 discharging directly into an orifice 72 in the mold cavity 39. The extruder 71 is otherwise similar in construction to the extruder 10 of Figures 1 and 2. As a consequence, the mold charge is extruded directly into the mold cavity 39 and its extensions 42 and 43, the end of the strand or rope 12 being preferably led around the mold cavity 39 by grasping it with tongs and pulling it around the cavity 39. When a sufficient amount of charge has been accumulated, the extruder 71 is halted, and molding is then carried out in a manner similar to that described in connection with Figure 4.

What I claim is:
1. A process of molding pearlescent plastic articles from a pearlescent synthetic resin compound in a mold cavity, comprising reducing a compound composed of a plurality of mutually-incompatible pearlescent-producing plastics to a plastic condition, extruding the plastic compound into a plastic rope, coiling said rope into an open-centered coil having vertically stacked multiple turns of approximately the size of the mold cavity, placing the extruded coil in the mold cavity, and compressing the coil to fill a predetermined portion of said cavity.

2. A process of molding pearlescent plastic articles from a pearlescent synthetic resin compound in a mold cavity, comprising reducing a compound composed of a plurality of mutually-incompatible pearlescent-producing plastics to a plastic condition, extruding the plastic compound into a plastic rope, coiling said rope into an open-centered helical coil having vertically-stacked multiple turns of approximately the size of the mold cavity and having a plurality of turns, placing the extruded coil in the mold cavity, and compressing the coil to fill a predetermined portion of said cavity.

3. A process of molding pearlescent plastic articles from a pearlescent synthetic resin compound in a mold cavity, comprising reducing a compound composed of a plurality of mutually-incompatible pearlescent-producing plastics to a plastic condition, extruding the plastic compound into a plastic rope, coiling said rope into an open-centered coil of approximately the size of the mold cavity and having a plurality of turns, placing the extruded coil in the mold cavity, twisting portions of the coil relatively to other portions thereof, and compressing the coil to fill a predetermined portion of said cavity.

4. A process of molding pearlescent plastic articles from a pearlescent synthetic resin compound in a mold cavity, comprising reducing a compound composed of a plurality of mutually-incompatible pearlescent-producing plastics to a plastic condition, extruding the plastic compound into a plastic rope, coiling said rope into an open-centered coil having vertically-stacked multiple turns of approximately the size of the mold cavity and of a predetermined weight, placing the extruded coil in the mold cavity, and compressing the coil to fill a predetermined portion of said cavity.

5. A process of molding pearlescent plastic articles from a pearlescent synthetic resin compound in a mold cavity, comprising reducing a compound composed of a plurality of mutually-incompatible pearlescent-producing plastics to a plastic condition, extruding the plastic compound into a coil composed of a plurality of strands, said coil being of approximately the size of the mold cavity, placing the extruded coil in the mold cavity, twisting certain strands of the coil relatively to other strands thereof around the center line of the coil as an axis of twist, and compressing the coil to fill a predetermined portion of said cavity.

EDWARD MICHAEL McELLIGOTT.

References Cited in the file of this patent

UNITED STATES PATENTS

| Number | Name | Date |
|---|---|---|
| 251,259 | Lockwood | Dec. 20, 1881 |
| 317,776 | Heinrichs | May 12, 1885 |
| 664,896 | Robertson | Jan. 1, 1901 |
| 1,370,024 | Kempton | Mar. 1, 1921 |
| 1,607,623 | Higgins | Nov. 23, 1926 |
| 1,631,663 | Briggs | June 7, 1927 |
| 1,944,464 | Richardson | Jan. 23, 1934 |
| 2,353,457 | Goessling | July 11, 1944 |